US009083463B1

(12) United States Patent
Aviv et al.

(10) Patent No.: US 9,083,463 B1
(45) Date of Patent: Jul. 14, 2015

(54) SYSTEM AND METHOD FOR PROVIDING ACTIVE RF SHIELDING

(71) Applicants: David G. Aviv, Las Vegas, NV (US); Bobby Elijah Aviv, New York, NY (US)

(72) Inventors: David G. Aviv, Las Vegas, NV (US); Bobby Elijah Aviv, New York, NY (US)

(73) Assignee: Prophet Productions LLC, New York, NY (US)

( * ) Notice: Subject to any disclaimer, the term of this patent is extended or adjusted under 35 U.S.C. 154(b) by 0 days.

(21) Appl. No.: 14/222,631

(22) Filed: Mar. 23, 2014

(51) Int. Cl.
*H04B 10/2575* (2013.01)
*H04B 10/25* (2013.01)
*H04L 29/06* (2006.01)

(52) U.S. Cl.
CPC ........ *H04B 10/2575* (2013.01); *H04B 10/2504* (2013.01); *H04L 63/30* (2013.01)

(58) Field of Classification Search
USPC .......................................... 385/139; 398/115
See application file for complete search history.

(56) References Cited

U.S. PATENT DOCUMENTS

| | | | |
|---|---|---|---|
| 6,643,447 B2 | 11/2003 | Guy et al. | |
| 7,099,552 B1 | 8/2006 | Oron et al. | |
| 7,296,938 B1 * | 11/2007 | Shapson et al. | 385/92 |
| 7,573,943 B2 * | 8/2009 | Cioffi | 375/260 |
| 8,340,279 B2 * | 12/2012 | Jagannathan et al. | 379/417 |
| 8,472,806 B2 * | 6/2013 | Woodward et al. | 398/115 |
| 8,538,270 B2 | 9/2013 | Seidel et al. | |
| 8,682,170 B2 * | 3/2014 | Prucnal | 398/115 |
| 8,761,555 B2 * | 6/2014 | Matsko et al. | 385/30 |
| 2014/0226973 A1 * | 8/2014 | Wolff et al. | 398/25 |

OTHER PUBLICATIONS

"Study of RF Emissions of Various Electronic Devices Used by the Public," Letertre et al., 2011 IEEE International Conference on Microwaves, Communications, Antennas and Electronic Systems, COMCAS 2011; Tel Aviv; Israel; Nov. 7, 2011 through Nov. 9, 2011.
"Fiber Optic Essentials," Casimer Decusatis et al., Academic Press, 2006.

\* cited by examiner

*Primary Examiner* — Daniel Petkovsek
(74) *Attorney, Agent, or Firm* — Amy L. Pearson

(57) ABSTRACT

A system and method for removing radio frequency emissions from an electronic device. The system comprises collectors for collection of the radio frequency signals, combiners for combining the signals to produce a combined signal, fiber optic transmitter for up-converting the combined radio frequency signals to an optical wave length signal, optical fiber for directing the optical signal, and a heat sink for terminating the optical signal.

23 Claims, 7 Drawing Sheets

SYSTEM AND METHOD FOR PROVIDING ACTIVE RF SHIELDING

BACKGROUND OF THE INVENTION

This disclosure relates generally to methods and systems for radio frequency ("RF") shielding of electronic devices. Electronic devices are considered ubiquitous in today's society. Electronic devices are found everywhere and are used by everyone. Many electronic devices emit RF and many times can receive unintentionally spurious RF transmissions. For example, a common experience is the interference created when using a microwave and a cordless phone at the same time. The RF emissions from the microwave may interfere with the operation of the cordless phone and render the cordless phone inoperable until the microwave is turned off. Another common experience is the interference created when using a microwave and a WiFi router at the same time. In this example, the RF emissions from the microwave may interfere with the operation of the WiFi router and render the WiFi inoperable until the microwave is turned off or the WiFi router is switched to a different frequency. These are common examples that demonstrate that microwave ovens have RF emissions that may interfere with other devices that rely on RF for communications. More information about RF emissions from various electronic devices can be found in, "Study of RF Emissions of Various Electronic Devices Used by the Public" by Letertre et al., which is hereby incorporated by reference.

When referring to RF emissions that interfere with other electronic devices, sometimes it is referred to as radio frequency interference ("RFI") or electromagnetic interference ("EMI"). Some may describe the emission of RF from an electronic device such as a microwave as RF leakage. However, in the present invention the reference to radio frequency ("RF") will refer to any of RF, RFI, RF leakage, EMI, RF energy, and spurious RF transmissions.

Hackers and/or enemies-of-the-state ("Hackers") can utilize RF emissions to hack into systems, attack systems, spy/monitor on systems, or disrupt systems. Hackers may target electronic devices such as computers, routers, appliances, mobile phones, cordless phones, switches, computer monitors, game consoles, DVD players, control electronics and other electronic devices that are likely to emit RF signals that could be detected by sensors located onboard an enemy platform including but not limited to ground-based, airborne and/or space-borne platforms. The RF emissions from such devices may comprise keyboard strokes, computer monitor images, drawings, private data, business data, financial data, political data, defense data, internet URLs, URL history, IP addresses, cookies, real time data, stored data, meta data, device usage data, electronic records, electronic files, video, audio, control signals, or any type of data, information or signal that an electronic device may contain or emit.

A sophisticated enemy may use a sensor to detect RF emissions to insert an external RF hacking signal that may be comprised of one or more of viruses, noise, or other enemy directed RF signals. In other situations a sophisticated enemy may use the detected RF emission locations to direct a high energy laser ("HEL") or an IREB (Intense Relativistic Electron Beam) system at those locations to physically destroy the electronic device. In other situations a sophisticated enemy may use a sensor to detect and monitor the RF emissions from certain electronic devices for intelligence purposes. Examples of where an enemy or hacker may be interested in RF emissions might be at a utility plant (i.e. electric, gas, water, solar, oil etc. . . . ) or at a corporate competitor. Hackers may detect RF emissions and use techniques mentioned above to disrupt or destroy elements of the utility plant.

In order to control RF/EMI, an industry has developed around shielding materials. Shields are measured by its "shielding effectiveness" (SE). An electro-magnetic (EM) shield is essentially any barrier placed between an EM emitter and a susceptor, and it is designed to reduce the field strength of the emitter. The losses in EM emitter field strength are a function of the barrier's electrical and physical characteristics, such as its permeability, conductivity, and thickness; the frequency of the EMI; and the distance from the EMI source to the barrier/shield. The total SE of the shield is the sum of the reflection, absorption, and re-reflection losses. For more information see "Eyeing EMI/EMC In RF Designs," by Jack Browne, Microwaves & RF (www.mwrf.com), June 2011, which is hereby incorporated by reference.

One method of shielding electronic devices comprises placing the electronic device in a box made of metal such as aluminum, steel or copper. In this method the electronic device continues to emit RF, however most of the RF emission is contained inside the box and not allowed to escape the box. Other methods include placing the electronic device in an enclosure made of metal screen such as a Faraday cage. Other methods include shielding entire rooms with metal and placing several electronic devices in such rooms. Shielding material may be made of metal, metal screen, woven-in metallic fabric, foam, or can be a metalized paint. In a building, windows can have special metallic louvers or embedded metal screens to minimize RF leakage. All of these methods are referred to as passive shielding solutions. The problem with passive shielding solutions is that RF still leaks. In other words, the RF signals still escape from the enclosure. Generally these passive shielding solutions dampen but do not eliminate RF emissions.

Shielding has also been used on individual components of a circuit board. Again this approach is considered passive shielding. Even encasing a component in metal does not eliminate the RF emission completely.

BRIEF SUMMARY OF THE INVENTION

In various embodiments the invention provides for the active RF shielding of electronic devices. In one aspect the invention provides a system and method for detecting, collecting, up-converting, directing, and terminating RF emissions from an electronic device. In one aspect of the invention, RF emissions are detected and located on an electronic device. In another aspect of the invention, both the radiative and conductive aspects of the RF emission are collected. In another aspect of the invention, RF is up-converted to laser wavelength-band and directed onto optical fiber cable. In another aspect of the invention the optical fiber is terminated by a slightly tilted mirror which faces the incoming laser plus the optical equivalent of its associated RF signal. In one embodiment of the invention, the system is an analog implementation of the invention. In another embodiment of the invention, the system is a digital implementation of the invention.

BRIEF DESCRIPTION OF THE DRAWINGS

Illustrated in the accompanying drawing(s) are embodiments of the present invention In such drawings.

The above described drawing figures illustrate the described apparatus and its method of use in several preferred embodiments, which are further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

DETAILED DESCRIPTION OF THE INVENTION

Active RF shielding ("ARFS") is achieved by up-converting RF emissions from an electronic device to a laser wavelength-band which will then be fed into a fiber optic cable and then terminated. Fiber optic cables are used because optical fibers are immune to electromagnetic interference and do not leak electromagnetic radiation or RF. This insures that the up-converted laser signal will be kept within the optical cable and thus not radiate outside of the fiber optical cable. The fiber optic cable is connected to a heat sink where the signals are terminated. Terminating the signals using a heat sink ensures the minimizing of RF emissions. Further, since optical cables do not leak RF nor laser signals, they are difficult to tap into without being detected. To further reduce the intensity of the output of the upconverter subsystem, as the up-converted laser signal enters and navigates through the fiber-optic cables, there may be placed within the cable, a number of patches whose function is to absorb, scatter and reflect-backwards the laser signal, as it moves through the cable. The patches are approximately 1 cubic cm in size and are material such as small sized rocks and a bit of sand. The patches may also contain small bags of sand. The bag material is made of cheese cloth or other loosely woven fabric.

Figure 1:
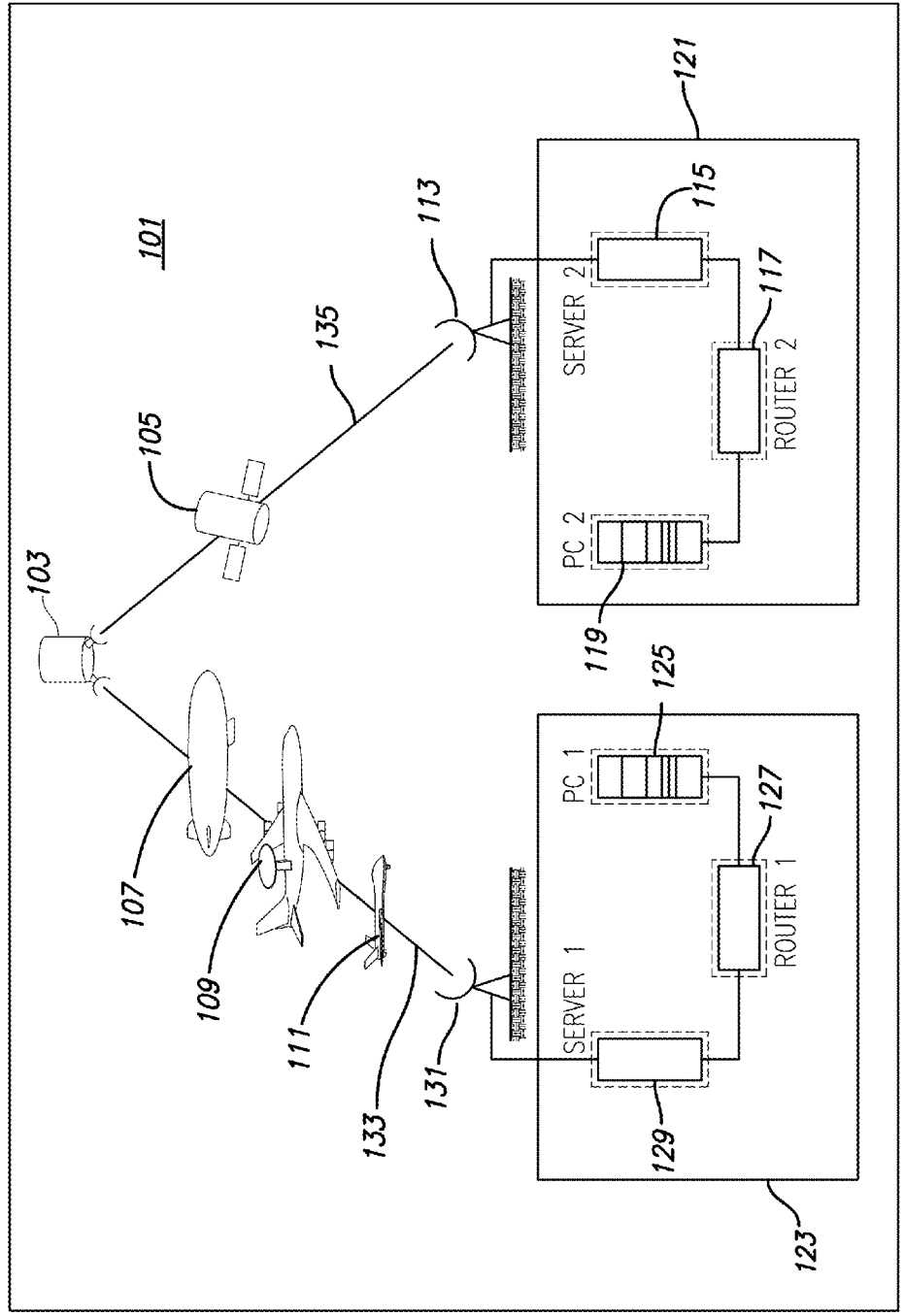
FIG. 1 is a diagram showing one aspect of the invention, two computer networks configured to communicate via a synchronous satellite.

FIG. 1 depicts a diagram of a computer communications network 101, two computer networks 121 and 123 configured to communicate via a geosynchronous satellite 103. Computer network 121 comprises server 115, router 117, and PC 119. Computer network 123 comprises server 129, router 127, and PC 125. Each computer network is connected to a ground station 113 and 131 respectively. Although not shown, each computer network 121 and 123 may comprise multiple PCs, multiple routers, and multiple servers.

Although not shown in FIG. 1, the geosynchronous satellite 103 can be removed from the diagram and replaced with an Internet cloud. In other words, the two computer networks 121 and 123 can communicate with each other via the Internet and not necessarily with just the geosynchronous satellite 103. In this case ground stations 113 and 131 may be substituted with gateways or other devices to enable Internet communication.

FIG. 1 depicts a situation where network 101 is vulnerable to an enemy/hacker intercepting RF emissions from any of the network devices depicted. Network 121 is also vulnerable to an external RF hacking signal that could be received at ground stations 113 or 131. The dotted lines around servers 115 and 129, routers 117 and 127, PCs 119 and 125 represent the RF emissions from these devices. These RF emissions may be received by sensors on-board platforms such as UAV 111, surveillance aircraft 109, airship 107 and low earth orbiting ("LEO") satellite 105. Additionally, communication links 133 and 135 from each of the ground stations 131 and 113 emit RF and can also be intercepted by UAV 111, surveillance aircraft 109, airship 107 and LEO satellite 105 or a ground based person or vehicle (not shown). The RF emissions depicted in network 101 presents a very lucrative situation for a hacker because it is vulnerable to enemies and hackers. Network 101 is both a treasure trove of information to be gained and an opportunity for many different pathways to inject hacking signals into the network.

Figure 2:
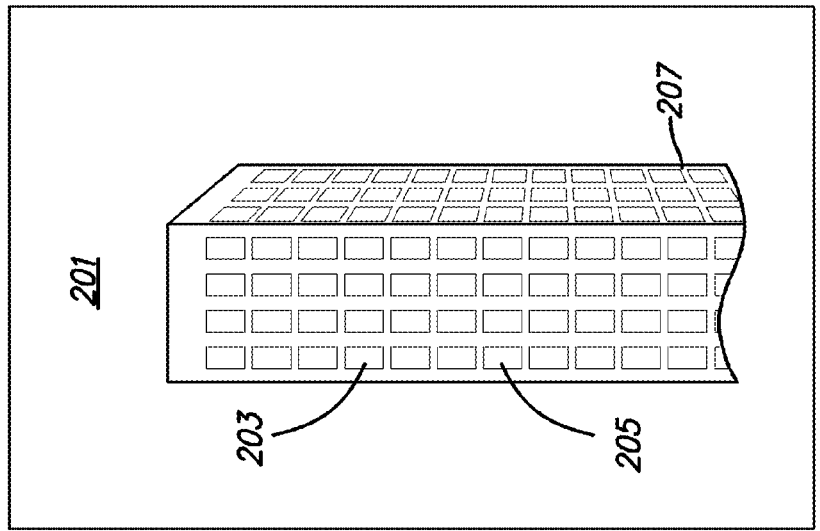
FIG. 2 is a diagram showing one aspect of the invention, a network subject to an enemy/hacker on a different floor of a building.

FIG. 2 depicts a situation where a vulnerable network is located at position 205 on the 20$^{th}$ floor of a building 207 and an enemy/hacker located at position 203 on the 23$^{rd}$ floor of the building 207. The vulnerable network located at position 205 on the 20$^{th}$ floor comprises computers, routers, and servers leaking RFI similar to computer networks 121 or 123 leaking RFI in FIG. 1. From the 23$^{rd}$ floor at position 203, an enemy/hacker is able to monitor or attack the vulnerable network located at position 205 on the 20$^{th}$ floor. The vulnerable network located at position 205 could benefit from the present invention.

Figure 3:
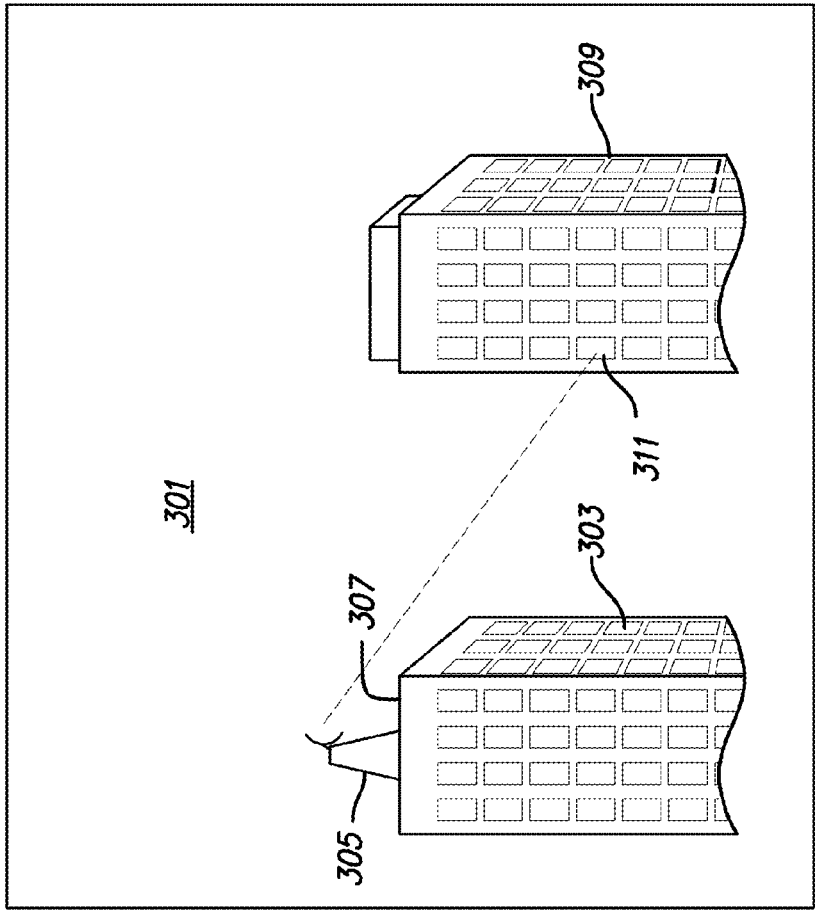
FIG. 3 is a diagram showing one aspect of the invention, directing a RF hacking/monitoring signal from one building to the other.

FIG. 3 depicts a situation where an enemy/hacker located in building 307 is monitoring leaking RFI signals or inserting a hacking signal into leaking RFI signals emitted from a vulnerable network located at position 311 in building 309. The vulnerable network located at position 311 comprises computers, routers, and servers leaking RFI similar to computer networks 121 or 123 leaking RFI in FIG. 1. An enemy/hacker sets up antenna 305 on building 307 for the purpose of monitoring and/or inserting a hacking signal into network located at position 311. The vulnerable computer network located at position 311 could benefit from the present invention.

Figure 4:
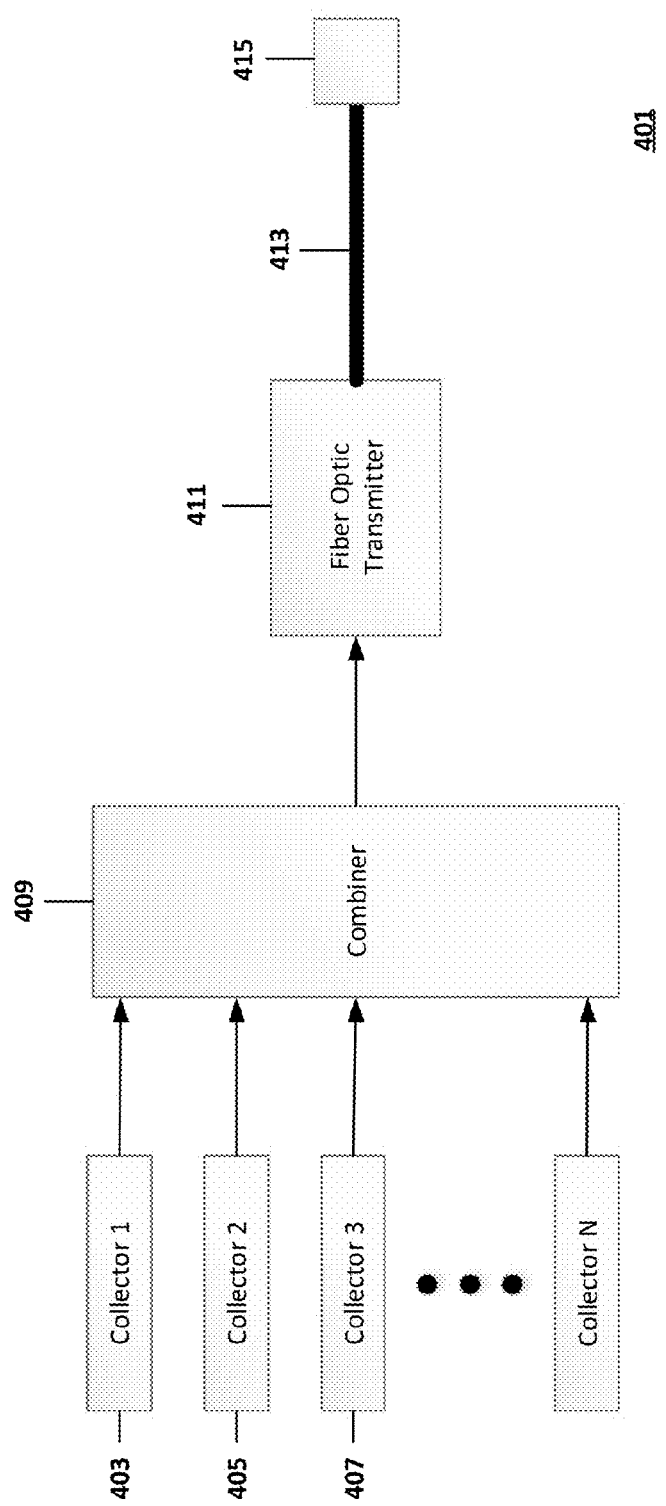
FIG. 4 is a diagram showing one aspect of the invention, a logical diagram of the RF emissions from an electronic device from capture to termination of the RF emission.

FIG. 4 depicts the active RF shielding ("ARFS") solution 401 and its components which comprise collectors 403, 405, 407, an RF combiner 409, a fiber optic transmitter 411, a fiber optic cable 413, and optionally a heat sink 415.

403, 405, and 407 depict three of N RFI collectors (where N is the total number of collectors). The RFI collectors 403, 405, 407 may collect either RF that is conducted via wires or RF that is emitted electromagnetically from an electronics device (not shown). The collector will be different depending on the type of RF collected either conduction through physical wires or electromagnetic radiation.

In one aspect of the present invention, conductive collectors are used to collect conductive RFI. Conductive collectors may be copper shielded wires, coaxial cables or other type of conductive element capable of conducting RF. The conductive collectors are each connected to an appropriate conduction point on the circuit board. Such a conduction point may be, for example, a solder joint that is conducting/leaking RFI. Other conduction points may include via's, leads, or any type of surface that may exist on an electronic device. Conduction collectors may be tuned to the bandwidth, frequency or frequencies of the conducted RF using a tuner for each conduction collector. Such tuner may comprise a tank circuit or a parallel combination of a capacitor (C) and an inductor (L) type circuit. The tuning elements of a conduction collector is not shown in FIG. 4.

In another aspect of the present invention, radiative collectors are used to collect RF electromagnetic radiation emanating from specific locations or areas of a circuit board. Radiative collectors may be small/micro/nano antennas. The antennas may be designed to receive a single frequency or frequencies emanating from an RF radiation location or from multiple locations. In one aspect of the invention, the antennas may be micro-electro-mechanical ("MEMS") devices. These antennas may be small enough to fit on a microchip. The antennas may be an array of MEMS antennas or could be just a single antenna. In other aspects of the invention the antennas may be horn antennas or parabolic antennas configured to receive the RF electromagnetic radiation. However, in each case, the antenna will be designed to receive the bandwidth, range of frequencies or single frequency emanating from the one or more targeted RF sources on the circuit board. The tuning elements of a radiative collector is not shown in FIG. 4.

The outputs of the collectors 403, 405, and 407 may optionally be routed to an enclosure connector that may be mounted to the outside of the enclosure of the electronic device. The enclosure connector is not shown in FIG. 4. However, the enclosure connector may be between the collectors and the combiner 409. In such an implementation, the present invention may be a modular device containing an external connector that connects to the enclosure connector on the outside of an enclosure and provides elements 409, 411, 413, and optionally 415. In this embodiment, a manufacturer could collect RF leakage and route the collected signals to an enclosure connector. Then the remainder of the invention could be connected as an external connector as a separate but optional piece of hardware to that device. Once each of the locations of the RF energy has a collector connected to it using the types of collectors described above, the RF is then carried to an RF combiner 409.

In one aspect of the present invention, the RF combiner 409 is any one of the commonly available RF combiners sold by Mini-Circuits, Inc. (www.minicircuits.com) or L-com, Inc. (www.l-com.com). The RF combiner 409 adds-up or sums the various collected RF signals. In other aspects of the present invention, the RF combiner comprises analog operation amplifiers configured to sum the input RF signals. The configuration of these operational amplifiers to sum the RF signals is known to those of skill in the art and discussed further in "Operational Amplifiers: Integrated and Hybrid Circuits". Examples of such operational amplifiers are provided in "Op Amp Circuit Collection" by National Semiconductor, Application Note 31, September 2002, which is hereby incorporated by reference. The output of the RF combiner 409 connects to the input of a fiber optic transmitter 411.

The fiber optic transmitter 411 up-converts the combined RF signals to an optical signal (laser wavelength-band). The fiber optic transmitter is a common device as is known in the art. Fiber optic transmitters convert an incoming pulse (voltage) into a precise current pulse to drive any one of LED, Fabry-Perot Laser, DFB Laser, or vertical cavity surface-emitting lasers (VCSEL). Lasers generally are biased with a low DC current and modulated above that bias current to maximize speed. In one aspect of the present invention, the fiber optic transmitter may be selected from the various fiber optic transmitters supplied by Miteq, Inc. (www.miteq.com).

Selection of the fiber optic transmitter may depend on certain parameter selections known to those of skill in the art and discussed further in "Fiber Optic Essentials", by Casimer Decusatis et al., which is hereby incorporated by reference. Other examples of fiber optic transmitters may be found at ViaLite Communications, Inc. (www.vialite.com). ViaLite Communications, Inc., sells optical transmitters that are capable of converting RF signals to optical signals using laser diodes. One advantage of up-converting the combined RF signal (that is output from the RF combiner 409) to an optical band, is that it continuously eliminates the combined RF signal and therefore removes existing RF leakage. Fiber optic signals once on the core of the fiber do not have RF emissions. The fiber optic transmitter outputs the up-converted signal into a fiber optic cable 413.

In one embodiment, the fiber optic cable is terminated using a heat sink 415. The heat sink 415 is not a required element in the present invention. However, it is necessary that the optical signal get terminated or dampened. The heat sink 415 absorbs or terminates the signals in the fiber optic cable, thus removing much of the up-converted RF. The heat sink 415 may be composed of various ways to attenuate the up-converted/optical signal. In some aspects, the heat sink 415, may absorb or scatter the signal. In another aspect of the present invention, the heat sink 415 may be of a design disclosed in U.S. Pat. No. 6,643,447 by Guy et al which is hereby incorporated by reference. Guy, et al describes a heat sink in which optical energy transmitted from the output end of a fiber optic cable is reflected repeatedly between two mirror image involute-shaped cavities to prevent optical energy from being reflected back in to the output end of the optical fiber thus achieving an attenuation. Since the optical fiber is not carrying a communications signal, the reflection of optical light back upstream to the fiber optic transmitter in some embodiments is not a factor. In other aspects of the present invention, the heat sink 415 is an optical signal absorbent material such as sand. The end of the optical fiber 413 can be inserted into sand and the sand will absorb the optical signal and provide the necessary attenuation of the optical signal. In other aspects of the present invention, a heat sink may not be used. For example, the optical fiber may be wound up in a coil. In this case, the fiber optic cable must be long enough for sufficient attenuation to occur, for example, 10 feet. However, shorter lengths of optical fiber may be sufficient depending on the situation.

Figure 5:
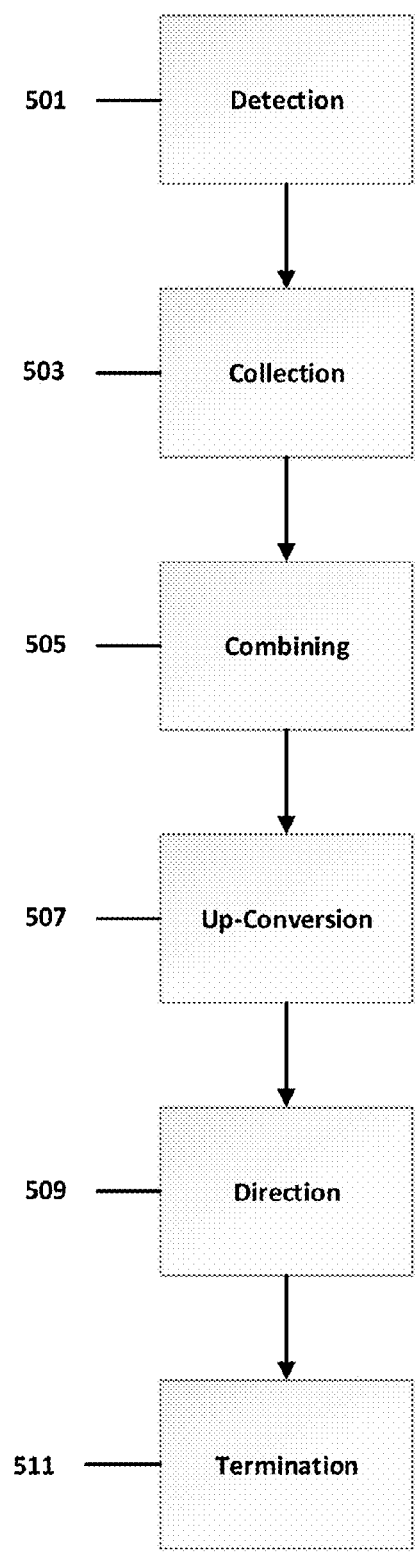
FIG. 5 is a flow diagram of a method showing one aspect of the invention for active RF shielding ("ARFS")

FIG. 5 depicts a flow diagram of a process for providing ARFS. The process may be performed by some or all of the system of FIG. 4. Process elements in FIG. 5 may be executed individually or in combination with any of the elements of FIG. 5.

In one embodiment, the RF energy radiated and/or conducted by an electronics device is detected as shown in block 501. The RF may be detected manually with a spectrum analyzer using a near field probe. The RF may also be detected automatically using automated methods. The location and frequency of the RF is recorded. The spectrum analyzer and near field probe combination will allow for the pinpointing of RF sources on or emanating from, for example, a circuit board. The spectrum analyzer is capable of identifying the peak intensities of the RF as a function of frequency in the area of the near field probe. In a typical circuit board, the number of RF sources should generally be less than 10, but depending on the source, can be more. However, this number depends on a variety of factors such as the complexity of the board, the quality of manufacturing, and the size of the components on the board. Once the locations of the RF sources are determined, each of the RF leakage characteristics is accurately measured. In addition, a voltmeter may be used to determine the amplitude of each RF source by physically moving the voltmeter probe about the RF signal source until the highest voltage peaks are reached. Additionally, the amplitude of the signal and the frequency of the RF signal source (with time as the abscissa) is determined using the spectrum analyzer. A circuit diagram will help the operator to identify the sources of the RFI leakage so that the correct collectors may be used in the collection step 503.

Figure 6:
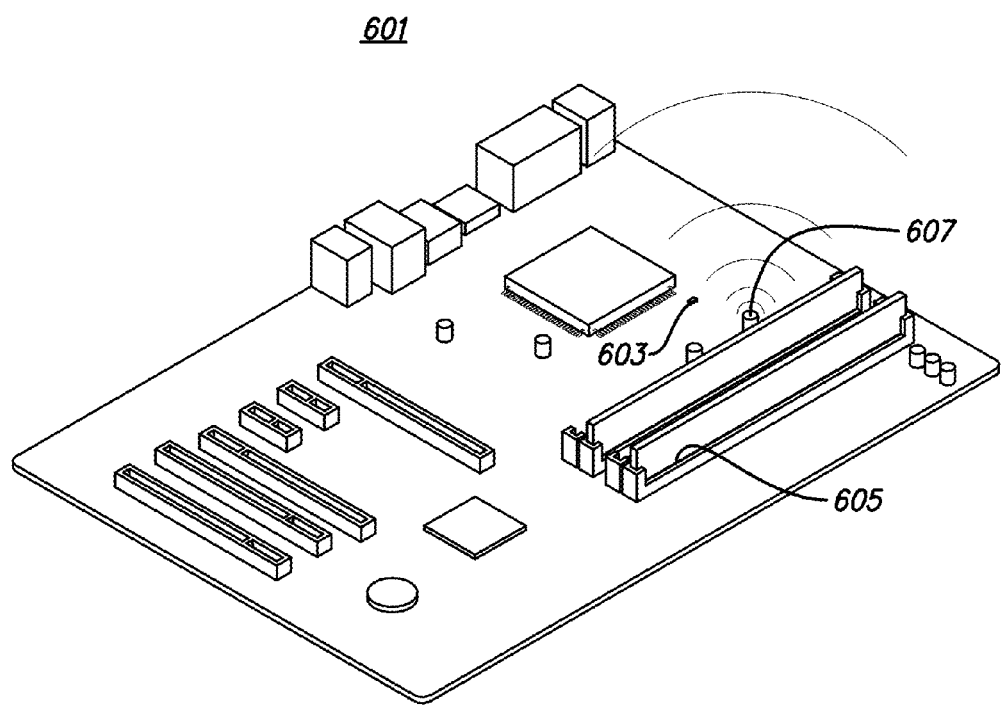
FIG. 6 is a diagram showing one aspect of the invention, a circuit board with three locations having EFI leakage that are in need of active RF shielding.

As an example of the detection step 501, FIG. 6 shows multiple leaked RF leaked signals having the following characteristics:

603 RF Leakage #1-60 Hz in frequency and 1.6 Volts in magnitude, from a solder joint 2 mm away from the CPU—between the CPU and a resistor on the circuit board;

605 RF Leakage #2-300 Hz in frequency and 2.3 Volts in magnitude, from pin #3 of the DRAM; and

607 RF Leakage #3-1200 Hz in frequency and 2.3 Volts in magnitude, radiating above a capacitor.

Frequencies may be much higher or lower and the voltages may be higher/lower than shown in the example above. The locations of the voltage peaks may be plotted on graph paper (perhaps circular quad paper) as a function of position. This plot may be used as an aid to accurately determine RF leakage position.

In one embodiment, leaked RF signals radiated and/or conducted from the electronics device is collected as shown in block 503. Conductive RFI leakage is collected with conductive RFI collectors and radiative RFI leakage is collected with radiative RFI collectors.

In one aspect of the present invention, the conducted RF energy is collected using thin coaxial cables connected to each RF conduction point on the circuit board. Each coaxial cable will be tuned to pick up the specific RF frequency or frequencies or range of frequencies or bandwidth at each location. The tuning circuit, in one aspect of the present invention, may be a tank circuit. A tank circuit is a simple parallel combination of a capacitor and inductor chosen or tuned such that the resonant frequency of the combination matches the frequency of the RF. In some aspects of the present invention, the thin coaxial cable may be of the copper shielded type. However, in other aspects, the coaxial cable is chosen based on its ability to carry the particular RF signal with minimal losses and minimal leakage radiation. In some aspects the coaxial cable is soldered to the conduction point on the circuit board.

In other aspects of the present invention, the radiative RF energy is collected using antennas. In some embodiments of the present invention small/micro/nano antennas configured to receive RF from specific locations on a circuit board. This type of collector collects RF electromagnetic radiation. In one aspect of the invention, the antennas may be micro-electromechanical ("MEMS") devices. These antennas may be small enough to fit on a microchip. The antennas may be an array of MEMS antennas or could be just a single antenna. In other aspects of the invention the antennas may be horn or parabolic antennas configured to receive the RF electromagnetic radiation. The antennas may be designed to receive a single frequency or a range of frequencies emanating from an RF radiation location. However, in each case, the antenna will be designed to receive the range of frequencies emanating from one or more RF sources on the circuit board. These types of antennas may also be configured outside of the electronic device. For example, parabolic antennas might be placed externally around an important storage device or router to collect any remaining RF. Parabolic antennas might also be used to collect all radiative RF that is in a particular room. In such a case, parabolic antennas might be placed in each ceiling corner of a room.

The collectors may be connected to the RF combiner by coaxial cables or . . . some other type of shielded wire such that the RF signals cannot leak. In order to minimize the number of RF leakages that are created the number of components and solder joints etc. . . . in the electronic device should also be minimized.

In one embodiment, the collected RF signals are summed into one combined signal as shown in block 505. In one aspect of the present invention, the RF signals from the collectors 403, 405, 407 are combined using RF combiner 409 discussed above, for example. The output of the RF combiner contains the summed up RF signals from the collectors.

In one embodiment, the combined RF signals are up-converted to an optical wavelength and inserted into an optical fiber as shown in block 507. In one aspect of the invention, the combined RF signal is inputted to a fiber optic transmitter where the up-conversion takes place as is known to those of skill in the art. The combined RF signals are up-converted to an optical signal and outputted to a fiber optic cable. In one aspect of the present invention the up-converter may be a device such as described in U.S. Pat. No. 8,538,270 by Seidel et al., which is hereby incorporated by reference.

In one embodiment, the optical signal is directed away from the fiber optic transmitter as shown block 509. In one aspect of the present invention, the optical signals are directed away from the fiber optic transmitter on a fiber optic cable. The fiber optic cable is selected based on the type of optical signal inserted on to the cable by the fiber optic transmitter 411. Ideally the fiber optic transmitter and fiber optic cable are selected to operate together in an optimal fashion. The length of the fiber optic cable depends on the method used for terminating or attenuating the up-converted signal as discussed above.

In one embodiment, the optical signal is terminated as shown in block 511. In one aspect of the present invention the fiber optic cable is connected to a heat sink for example heat sink 415, where all of the optical signals are terminated. In another aspect of the present invention, the fiber optic cable is connected to an optical terminator (fiber optic light trap) such as those produced by ThorLabs (www.thorlabs.com). Such an optical terminator is converts the optical power into heat and the power is attenuated inside the devices. Optical terminators can also have heat sink caps such as that discussed in U.S. Pat. No. 7,099,552 by Oron et al., which is hereby incorporated by reference.

FIG. 6 depicts a circuit board with three locations that are to be shielded using the present invention. As discussed above, 603, 605, 607 are the three locations on the circuit board that have RF leakage. 603, 605, and 607 are merely examples of RF leakage. Actual RF leakage will be unique and may not resemble anything like 603, 605, and 607.

Figure 7:
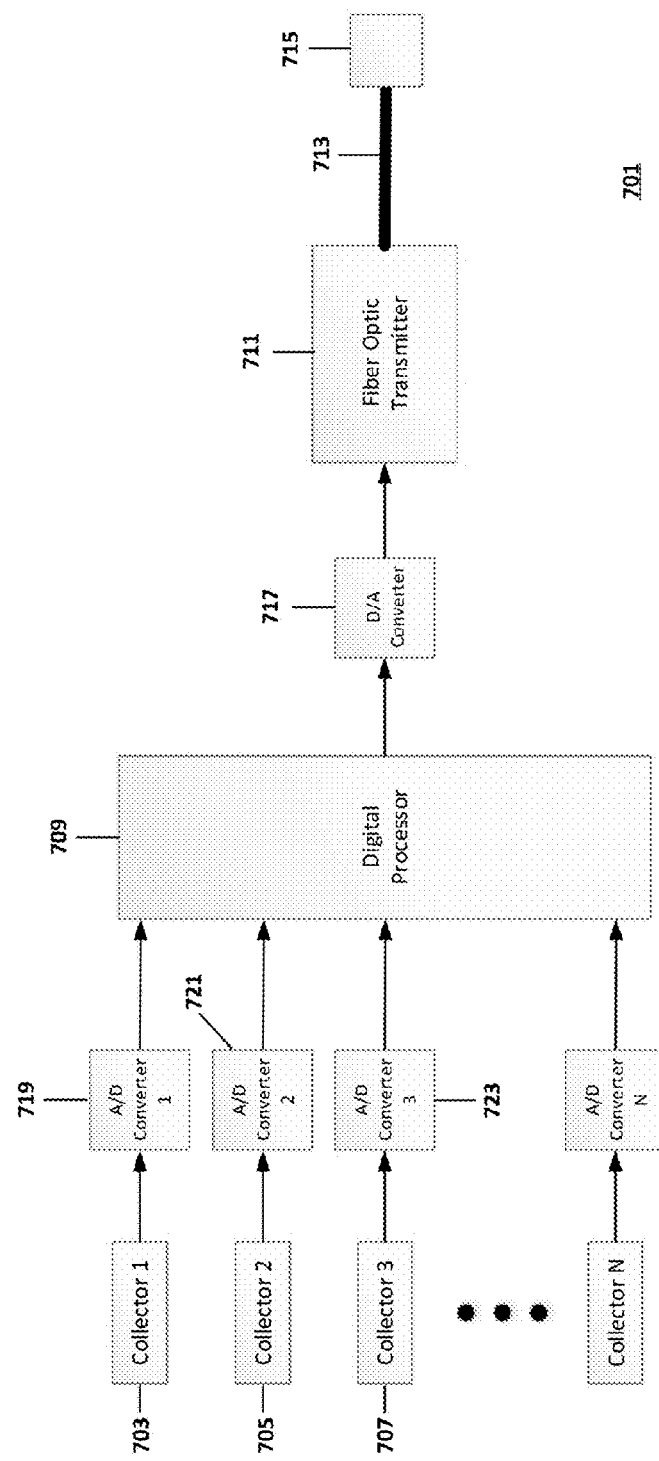
FIG. 7 is a diagram showing one aspect of the invention, a diagram of the RF emissions from an electronic device from capture to termination using digital components.

FIG. 7 depicts a digitally implemented embodiment of the present invention.

There are two types of interfering signals that may be generated from an electronic circuit—digital interfering signals and analog interfering signals. Digital interfering signals may be characterized by a square wave, a saw tooth wave or other RF that represents digital RF. If a user seeks to remove only digital interfering signals, then such signals need to be digitally added using digital arithmetic. The digital arithmetic may comprise floating point arithmetic, binary arithmetic, or binary coded decimal arithmetic. Digitally adding signals is commonly realized to be a more accurate addition process than adding/combining analog signals. If the user seeks to remove any analog interfering signals, the analog interfering signals should first be converted to digital to minimize inaccuracies in summing analog signals.

If the user seeks to remove both digital and analog interfering signals, all the analog interfering signals must first be separated from the digital interfering signals. This is done by digitizing the analog signals, and then adding all the resulting digital signals by means of digital arithmetic. At the same time, the digital signals are also added together. Digital RF signals are not purely digital and therefore should also be digitized to smooth the signal before adding the digital signals. Finally, the digitized analog signals are added to the digitized digital signals. This final resultant signal is then converted back to a large analog signal for up-conversion.

The system of FIG. 7 may implemented instead of the system of FIG. 4 where there are digital RF signals and/or for a more accurate addition process. 701 is the digitally enabled active RF shielding ("ARFS") solution of the present invention. 703, 705, and 707 depict N collectors (where N is the total number of collectors). The outputs of the collectors 703, 705, and 707 may optionally be routed to an enclosure connector that may be mounted to the outside of the enclosure of the electronic device as discussed in connection with FIG. 4. This connector is not shown in FIG. 7.

In FIG. 7, each of collectors 703, 705, and 707 depict collectors collecting either digital or analog signals. The analog or digital signals collected by collectors 703, 705, and 707 is then input to analog-to-digital converters 719, 721, and 723 respectively. For an analog RF signal, the A/D converter converts the analog signal into a digital signal. For a digital RF signal, the A/D converter smooths the signal into binary coded decimal. Analog-to-digital converters 719, 721, and 723 are common analog-to-digital converters as is known to one of skill in the art. The output of analog-to-digital converters 719, 721, and 723 are each inputted to digital processor 709.

In one aspect of the present invention, the digital processor 709 is any one of the commonly available DSP chips, FPGA, ASIC, or microprocessors such as those manufactured by Analog Devices (www.analog.com) and Texas Instruments (www.ti.com). The only requirement of the DSP, FPGA, ASIC or microprocessor is that it accept multiple digital signals and be capable of summing them together to form a single summed digital output. The output of the digital processor 709 connects to the input of a digital to analog converter 717.

The digital to analog converter 717 converts the summed digital signal from digital processor 709 to an analog version of the signal. The output of the digital to analog converter 717 connects to the input of the fiber optic transmitter 711.

The fiber optic transmitter 711 up-converts the summed analog signals to an optical signal as fiber optic transmitter 411 as discussed above in connection with FIG. 4. The fiber optic transmitter outputs the up-converted signal to a fiber optic cable 713. The fiber optic cable 713 is the same as the fiber optic cable 411 in FIG. 4 and will not be discuss further here. The fiber optic cable 713 terminates into a heatsink 715. The heat sink 715 is the same as heatsink 415 and will not be discussed further here.

Figure 8:
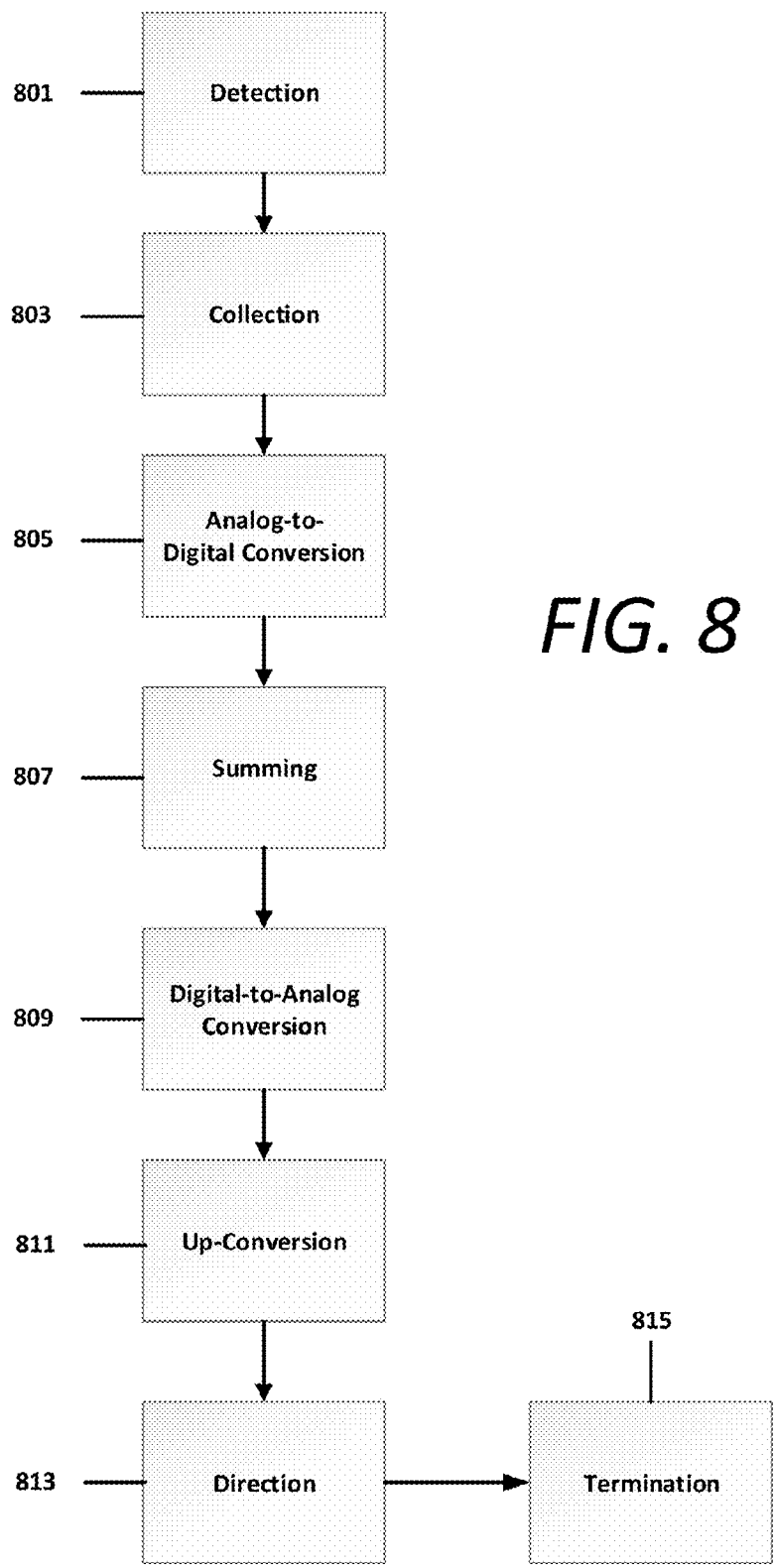
FIG. 8 is a flow diagram of a method showing one embodiment of the invention for a digital implementation of RF shielding ("ARFS").

FIG. 8 depicts a flow diagram of a process for providing digital ARFS. The process may be performed by some or all of the system of FIG. 7. Process elements in FIG. 8 may be executed individually or in combination with any of the elements of FIG. 7. The detection 801, collection 803, up-conversion 811, direction 813, and termination 815 steps of FIG. 8 are the same as that of the detection 501, collection 503, up-conversion 507, direction 509, and termination 511 steps of FIG. 5, respectively. The combining step 505 of FIG. 5 is replaced by steps 805, 807, and 809 of FIG. 8 for the digital implementation.

In one embodiment of the digital implementation, each of one or more analog collected signals is converted to digital signals using analog-to-digital converters as shown at block 805. The output of each of the one or more of the analog-to-digital converters is a digital signal that represents the original analog collected signal.

In one embodiment, all of the one or more digital signals are summed into one combined digital signal as shown at block 807. In one aspect of the present invention, the digital signals from the analog-to-digital converters are combined using digital processor 709. The output of the digital processor contains the combined digital signals from the collectors.

In one embodiment of the digital implementation, the process converts the combined digital signal to a combined analog signal, block 809. In one aspect of the present invention the process converts the combined digital signal into a combined analog signal using a digital-to-analog converter such as 717, for example. The output of the digital-to-analog converter contains the combined analog signals that originated from the collectors.

In one embodiment of the digital implementation, the process up-converts the combined analog signals to an optical wavelength and inserts the up-converted signal to an optical fiber, block 811. In one aspect of the invention, the combined analog signals are input to a fiber optic transmitter where the up-converting process takes place as is known to those of skill in the art. The combined analog signals are up-converted to an optical signal and outputted to a fiber optic cable. In one aspect of the present invention the up-converter may be a device as described in U.S. Pat. No. 8,538,270 and is hereby incorporated by reference.

In one embodiment of the digital implementation, the process directs the optical signal, block 813. In one aspect of the present invention the optical signals are directed on a fiber optic cable away from the fiber optic transmitter. A fiber optic cable is used to direct the signals from the output of the fiber optic transmitter.

In one embodiment of the digital implementation, the optical signal as shown in block 815. In one aspect of the present invention, the fiber optic cable is connected to a heat sink for example heat sink 715, where all of the optical signals are terminated.

While the present invention has been described with respect to various preferred embodiments, it shall be understood that various other changes and modifications may be made to the invention in accordance with the scope of the claims appended hereto.

We claim:

1. A system for removing at least some radio frequency interference emissions, the system comprising:
   one or more collectors, each of the one or more collectors tuned to one or more bandwidths of the at least some radio frequency interference emissions, each of the one or more collectors adapted to collect one or more signals;
   one or more combiners adapted to combine the one or more signals to produce a combined signal;
   a fiber optic transmitter adapted to up-convert the combined signal into an optical signal; and
   a termination device adapted to terminate the optical signal.

2. The system of claim 1, wherein the termination device comprises one or more of:
   a fiber optic cable; and
   a heat sink.

3. The system of claim 2, wherein the fiber optic cable comprises one or more patches.

4. The system of claim 1, wherein the system removes one of:
  most of any radio frequency interference emissions from one or more of an electronic device and a circuitry; or
  all radio frequency interference emissions from one or more of an electronic device and a circuitry.

5. The system of claim 1, wherein the one or more signals comprise one or more of:
  one or more analog signals; and
  one or more digital signals,
  the system further comprising:
  one or more analog-to-digital converters for converting each of the one or more analog signals to one or more converted digital signals;
  one or more digital processors for summing the one or more converted digital signals and the digital signals to form a summed digital signal; and
  one or more digital-to-analog converters for converting the summed digital signal to produce the combined signal.

6. The system of claim 5, wherein the termination device comprises one or more of:
  a fiber optic cable; and
  a heat sink.

7. The system of claim 6, wherein the fiber optic cable comprises one or more patches.

8. The system of claim 5, wherein the system removes one of:
  most of any radio frequency interference emissions from one or more of an electronic device and a circuitry; or
  all radio frequency interference emissions from one or more of an electronic device and a circuitry.

9. A method for removing at least some radio frequency interference emissions, the method comprising:
  tuning one or more collectors to one or more bandwidths of the at least some radio frequency interference emissions, each of the one or more collectors adapted to collect one or more signals;
  combining the one or more signals to produce a combined signal;
  up-converting, with a fiber optic transmitter, the combined signal into an optical signal; and
  terminating the optical signal with a termination device.

10. The method of claim 9, further comprising:
  directing the optical signal.

11. The method of claim 9, wherein the optical signal is terminated using one or more of:
  a fiber optic cable; and
  a heat sink.

12. The method of claim 11, wherein the fiber optic cable comprises one or more patches.

13. The method of claim 9, wherein the method removes one or more of:
  most of any radio frequency interference emissions from one or more of an electronic device and a circuitry; or
  all radio frequency interference emissions from one or more of an electronic device and a circuitry.

14. A system for removing at least some radio frequency interference emissions from an electronic device, the system comprising:
  one or more collectors, each of the one or more collectors tuned to one or more bandwidths of the at least some radio frequency interference emissions, each of the one or more collectors adapted to collect one or more signals;
  an enclosure connector for routing the one or more signals, the enclosure connector adapted to connect to an up-conversion device, wherein the up-conversion device comprises:
    one or more combiners adapted to combine the one or more signals to produce a combined signal;
    a fiber optic transmitter adapted to up-convert the combined signal into an optical signal; and
    a termination device adapted to terminate the optical signal.

15. The system of claim 14 further comprising an external connector for connecting the enclosure connector to the up-conversion device.

16. The system of claim 14, wherein the termination device comprises one or more of:
  a fiber optic cable; and
  a heat sink.

17. The system of claim 16, wherein the fiber optic cable comprises one or more patches.

18. The system of claim 14, wherein the system removes one of:
  most of any radio frequency interference emissions from the electronic device; or
  all radio frequency interference emissions from the electronic device.

19. The system of claim 14, wherein the one or more signals comprise one or more of:
  one or more analog signals; and
  one or more digital signals,
  the system further comprising:
  one or more analog-to-digital converters for converting each of the one or more analog signals to one or more converted digital signals;
  one or more digital processors for summing the one or more converted digital signals and the digital signals to form a summed digital signal; and
  one or more digital-to-analog converters for converting the summed digital signal to produce the combined signal.

20. The system of claim 19, wherein the termination device comprises one or more of:
  a fiber optic cable; and
  a heat sink.

21. The system of claim 20, wherein the fiber optic cable comprises one or more patches.

22. The system of claim 19, wherein the system removes one of:
  most of any radio frequency interference emissions from the electronic device; or
  all radio frequency interference emissions from the electronic device.

23. A system for removing at least some radio frequency interference emissions from an electronic device, the system comprising:
  a collector tuned to one or more bandwidths of the at least some radio frequency interference emissions, the collector adapted to collect one or more signals;
  an enclosure connector for routing the one or more signals, the enclosure connector adapted to connect to an up-conversion device, wherein the up-conversion device comprises:
    a combiner adapted to combine at least one of the one or more signals to produce a combined signal;
    a fiber optic transmitter adapted to up-convert the combined signals into an optical signal; and
    a termination device adapted to terminate the optical signal.

* * * * *